(12) United States Patent
Meadows et al.

(10) Patent No.: US 7,654,709 B2
(45) Date of Patent: Feb. 2, 2010

(54) COMPACT FLUORESCENT LAMP HIGH BAY LUMINAIRE

(75) Inventors: Dan Meadows, Paradise Valley, AZ (US); Kory Schuknecht, Scottsdale, AZ (US); William E. Schrader, Fountain Hills, AZ (US)

(73) Assignee: Sportlite, Inc., Phoenix, AZ (US)

( * ) Notice: Subject to any disclaimer, the term of this patent is extended or adjusted under 35 U.S.C. 154(b) by 112 days.

(21) Appl. No.: 11/731,272

(22) Filed: Mar. 30, 2007

(65) Prior Publication Data

US 2008/0239732 A1    Oct. 2, 2008

(51) Int. Cl.
*B60Q 1/06*    (2006.01)
(52) U.S. Cl. ...................... 362/373; 362/260
(58) Field of Classification Search ............. 362/373, 362/260
See application file for complete search history.

(56) References Cited

U.S. PATENT DOCUMENTS

| | | | |
|---|---|---|---|
| 4,858,089 A | 8/1989 | Pietro | |
| 5,172,973 A | 12/1992 | Spada | |
| 5,523,931 A | 6/1996 | Kassay et al. | |
| 5,651,609 A * | 7/1997 | Pelton et al. | 362/294 |
| RE36,414 E | 11/1999 | Tickner | |
| 6,447,147 B1 * | 9/2002 | Kramer et al. | 362/297 |
| 6,905,226 B2 * | 6/2005 | Tickner et al. | 362/235 |
| 2006/0232984 A1 | 10/2006 | Schuknecht | |

OTHER PUBLICATIONS

"Compact Fluorescent Lamps: What You Should Know," D.W. Finn and M.J. Ouellette, National Research Council Canada, Institute for Research in Construction, available from the internet as of Jan. 5, 2007.
"LX-Series Starliter" of Sportlite, Inc. A data sheet.
Independent Report Prepared By: Ian Lewin, Ph.D.
Independent Report Prepared By: Russell W. Blades C.E.T. of Bassai Limited, Burlington, Ontario, Canada.
LX 800-Series and other catalog sheets, Sportlite.
U.S. EPA, Green Lights Update, Jan. 1993.

* cited by examiner

*Primary Examiner*—Sandra L O'Shea
*Assistant Examiner*—Evan Dzierzynski
(74) *Attorney, Agent, or Firm*—Douglas W Rudy (57) ABSTRACT

A compact fluorescent lamp luminaire with chambered structure to improve ventilation for controlling the temperature of ballasts and lamps in the luminaire. In such compact fluorescent lamp luminaires a plurality of compact fluorescent lamps is arranged inside a dome structure. The compact fluorescent lamps are powered through ballasts. Heat generated by the lamps is exhausted out of the luminaire without air heated by the lamps from passing through a chamber housing ballasts of the luminaire.

26 Claims, 9 Drawing Sheets

COMPACT FLUORESCENT LAMP HIGH BAY LUMINAIRE

BACKGROUND OF THE INVENTION

1. Field of the Invention

This invention pertains to lighting fixtures featuring compact fluorescent lamps. More specifically, the invention is directed to apparatus and methods that improve ventilation for controlling the temperature of ballasts and lamps in compact fluorescent light fixtures. In such compact fluorescent light fixtures, sometimes referred to as "luminaires," a plurality of compact fluorescent lamps is arranged inside a dome structure. The compact fluorescent lamps are powered through ballasts. Luminaires of this type are used in various installations such as factories, gymnasiums, sports arenas, large stores and warehouse buildings, as well as other structures and outdoor applications.

2. Description of Related Art

Incandescent and strip lamp fluorescent lighting fixtures are used in many applications and environments. For certain installations, typically large bay installations, dome style fixtures that are arranged in a grid pattern above an area to be lighted have replaced incandescent and strip lamp fixtures. Early adaptations of the dome style fixtures incorporated high intensity discharge lamps.

The use of luminaires designed for compact fluorescent lamps has become a viable alternative to high intensity discharge lamp fixtures. An early adaptation of compact fluorescent lamps is shown in U.S. Pat. Re: 36,414, "Lighting Apparatus," Jerold A. Tickner, herein incorporated by reference. Also herein incorporated by reference is U.S. Pat. No. 6,905,226 for "Compact Fluorescent Light Fixture" to Tickner, et al. and U.S. Application Publication No. US-2006-0232984-A1 of K. Schuknecht for "Compact Fluorescent Lamp Fixture Ventilation Method and Apparatus." A data sheet entitled "LX-Series Starliter" of Sportlite, Inc. related to high-bay luminaires is also incorporated by reference herein.

The high intensity discharge lamp fixtures being superseded are commonly mercury vapor, metal halide, and high and low pressure sodium lamps of high wattage. Compact fluorescent lamps in luminaires designed to replace these high intensity discharge lamp fixtures can be significantly more energy efficient and have other benefits as well. For instance, mercury vapor, metal halide, and high and low pressure sodium lamps take time to start, turn on and get up to full lumen output. Once such high intensity discharge lamps are turned on and operating it is preferable to leave the lamps on. On the other hand, an advantage over the high intensity discharge lamps is that the compact fluorescent lamps start and turn on quickly and may be switched on and off with relative frequency in a short time span. Thus, in a warehouse situation for instance, where compact fluorescent lamps are installed, the lamps can be turned off as workers leave the warehouse room for a short period of time. If, however, the warehouse room is lighted using high intensity discharge lamps such as mercury vapor, metal halide, and high and low pressure sodium lamps, it is not practical to turn such fixtures off since, if they need to be turned back on in a short time, not only is the energy needed to turn the fixtures back on significant, but these type of fixtures are slow to start thus preventing quick full light availability in a room.

Multiple ballast compact fluorescent lamps are easily step dimmed by selecting the number of ballasts and/or lamps that are turned on or off. The idea in step dimming is that some but not all of the lamps in a luminaire are turned off to lower the light output in steps rather than having the luminaire only being able to be on or off. Step dimming gives more light output flexibility. In at least one embodiment, a fluorescent fixture will have a single ballast connected to two fluorescent lamps. In a luminaire used to light a large area there may be multiple ballasts, for instance, more than one ballast, and multiple lamps, for instance more than two lamps, supported in each luminaire. To step dim a multi ballast and multi lamp luminaire a first ballast will be shut off to shut down lamps associated with that ballast. If further dimming is desired then another ballast will be shut off and the lamps connected to that ballast would be shut down. Several ballasts can be shut down at once, that is, it is possible but not necessary, to shut down only one ballast at a time. Step dimming assumes that the luminaire being step dimmed has multiple ballasts and lamps.

Compact fluorescent lamps operate at peak light output efficiency when each of the several lamps of each luminaire is operating within an optimum temperature range. In actual installations the air temperature around a lamp will increase depending on the level of cooling available. Thus it is desirable to develop apparatus and luminaire ventilation procedures to provide ventilation for the lamps in a luminaire to minimize heat build up in the vicinity of the lamp. In many cases this means that the lamps, and the ballasts as discussed below, are run as cool as possible since it will be more likely than not that the lamps will tend to run hotter, rather than cooler, in the luminaire environment than they do in open air. To reduce the complexity and length of the Detailed Specification, and to fully establish the state of the art in certain areas of technology, Applicant herein expressly incorporates by reference the following article: "Compact Fluorescent Lamps: What You Should Know," D. W. Finn and M. J. Ouellette, National Research Council Canada, Institute for Research in Construction, available from the internet as of Jan. 5, 2007.

BRIEF SUMMARY OF THE INVENTION

This invention provides apparatus and methods for ventilating and cooling ballasts in compact fluorescent lamp fixtures and for operation of the lamps of such fixture in as close to a preferred operating temperature range as can be accomplished. In many environments the temperature of the lamps and ballasts in luminaires can become hotter than is optimal for maximum lumen output causing output from the lamps to decline. This invention will allow cooling of the lamps and ballasts and thus assist in maintaining lumen output at an optimum level.

One goal of the invention, but not the only goal, of this invention is to provide airflow through the ballast chamber to cool the ballasts and thereby increase the life expectancy of the ballasts. The invention is also designed to cool the lamps of the luminaire so that the lamps operate at a temperature that maximizes the lumen output from the lamps.

The present invention provides, among other things, a luminaire having multiple chambers. In one embodiment three chambers form a luminaire. A first chamber, the lamp chamber, comprises the area defined by, including, and inside the dome of the luminaire. This chamber houses the compact fluorescent lamps. This lamp chamber extends to and includes a socket plate that is a component of a transition chamber as well as a component of the lamp chamber.

The transition chamber, a second chamber or zone, located vertically adjacent and above the lamp chamber, extends from and includes the socket plate and an area of the transition chamber extending to an opening at the top of the transition chamber at the top of the luminaire. The socket plate forms the top of the lamp chamber and the bottom of the transition chamber. The socket plate of the transition chamber is provided with at least a single aperture or, in one embodiment, multiple apertures allowing heated air from the lamp chamber to flow through the socket plate and into the transition chamber. The transition chamber above the socket plate is an area that forms a passageway that is generally an open area surrounded by an interior wall of the ballast chamber.

The ballast chamber is the third chamber of a preferred embodiment of the luminaire. The ballast chamber is that area defined by a base, an interior wall or walls and the lid of the luminaire. The interior wall of the ballast chamber may make up the transition chamber above the socket plate. Alternatively, the transition chamber may have a wall independent of an interior wall of the ballast chamber. Ballasts of the luminaire are located in the ballast chamber.

As is clear from the above, the goal of the invention is accomplished by separating the lamp chamber from the ballast chamber and providing a transition chamber for directing heated air from the lamp chamber out the top of the luminaire, through an opening at the top of the transition chamber without the heated air entering the ballast chamber. Heated air is generated by the lamps and will rise by convection through the lamp chamber to and through the ventilation apertures in the socket plate. In one embodiment the ventilation apertures are generally adjacent and above the lamp sockets thus allowing heat from the sockets, due to exposure of the sockets to the heat generated by the lamps, to exit the top of the lamp chamber near the top of the dome.

Air will then flow by convection, the less dense hotter air tending to rise, through the transition chamber and out the opening at the top of the transition chamber. Heated air will not be directed into the ballast chamber. The ballasts will be out of the path of the heated air and thus the only significant heat that the ballasts will be exposed to is the heat generated by the ballasts themselves. Heat generated by the ballasts is manageable, as it will be exhausted from the top of the lid of the ballast chamber and through the sidewall of the lid, if in an embodiment where the sidewall is a ventilated sidewall, or through the top of the lid in embodiments where perforations are formed in the top but not the sidewall of the ballast chamber lid.

The object of the invention is to lower the operating temperature of ballasts supported in the ballast chamber of a luminaire.

Another object of the invention is to lower the operating temperature of compact fluorescent lamps of a luminaire in environments where the temperature of the lamps exceeds an optimum temperature for maximum lumen output of the lamps.

It is also an object of the invention to passively cool or moderate the temperature of a lamp chamber and of a ballast chamber of a compact fluorescent lamp luminaire.

Another object of the invention is to provide airflow apertures in a socket plate of a luminaire to allow heat from the lamp chamber of the luminaire to flow to a zone of the luminaire not occupied by ballasts of the luminaire.

It is another object of the invention to vent heated air that builds up in the lamp chamber of the luminaire to an area outside the luminaire.

It is also an object of the invention to increase the flow or movement of air in and through the luminaire.

Another object of the invention is to provide a transition chamber having an open end between the lamp chamber and the ballast chamber of a compact fluorescent lamp luminaire.

It is a further object of the invention to provide an improved compact fluorescent lamp luminaire where the ballast is spaced away from compact fluorescent lamps of the luminaire.

It is another object of the invention to provide an improved compact fluorescent lamp luminaire where the ballasts are not only spaced away from the lamps but are further isolated from compact fluorescent lamps of the luminaire.

It is also an object of the invention to locate a ballast chamber circumferentially about the transition chamber.

It is a further object of the invention to provide an improved compact fluorescent lamp luminaire where the ballast is isolated from convective heat given off by the compact fluorescent lamps of the luminaire.

It is another object of the invention to increase the life expectancy of the ballasts in a compact florescent lamp luminaire by controlling the temperature build up of the ballasts.

It is another object of the invention to operate a luminaire containing compact fluorescent lamps at a temperature that yields the highest lumen output from the lamps of the luminaire.

It is another object of the invention to provide a luminaire that is comprised of multiple chambers.

It is another object of the invention to separate the compact fluorescent lamp sockets, into which compact fluorescent lamps are inserted, from proximity to the ballasts used to operate the lamps.

Another object of the invention is to provide a transition chamber that includes at least a single aperture, but may include more than a single aperture, that assists in the evacuation of heated air from the lamp chamber of the luminaire.

It is another object of the invention to not allow heated air from the lamp chamber to enter the ballast chamber.

The above and other objects may be achieved through a compact fluorescent lamp luminaire that includes multiple chambers. The chambers may include: a) a lamp chamber being the area inside the dome of the luminaire up to and including a relatively bottom surface of a socket plate located generally at the top of the lamp chamber; b) a transition chamber defined by the area bordered by the relative upper surface of the same socket plate that comprises the top of the lamp chamber and an interior wall of a ballast chamber; and c) a third chamber, that being the ballast chamber mentioned in b) above. The interior wall of the ballast chamber defines an area that is a part of the transition chamber above the upper surface of the socket plate. This area allows the passage of air through the transition chamber from the lamp chamber to the open air above the luminaire. The interior wall of the ballast chamber that defines a portion of the transition chamber does not, in a preferred embodiment, allow air to pass from the transition chamber into the ballast chamber interior where one or more ballasts are mounted. To be clear, in one embodiment, the interior wall of the ballast chamber acts as a wall of the transition chamber and defines a portion of the transition chamber.

The transition chamber is a relatively unobstructed passageway. The transition chamber may include a conduit for wiring or a wire bundle from the exterior of the ballast chamber, for instance from an electrical box above the luminaire, to the ballasts housed in the ballast chamber. The transition chamber may also contain wires from the ballasts to the lamp sockets. In one embodiment, the transition chamber extends vertically through the lid of the ballast chamber of the luminaire and in another embodiment the top outlet of the transition chamber ends at and is aligned with a central aperture formed in the lid of the ballast chamber.

The lid of the luminaire is considered part of the ballast chamber and is made up of at least two parts—a top and a side portion. The top of the lid may include a central aperture generally aligned with the top of the transition chamber. The lid is positioned to cover the ballast chamber. The lid may also be provided with open areas, both on the top and on the sides of the lid, which allows heat generated from the ballasts or, if any, from heat that is transmitted or conducted into the wall of the ballast chamber from the dome or socket plate of the luminaire, to exit, either upwardly or laterally, from the ballast chamber. As expected, ballasts, at least one and generally more than one since one ballast can run one, two or more lamps and an eight-lamp fixture is a common configuration, are carried, position, or mounted in the ballast chamber.

The transition chamber comprises a socket plate, mentioned above with respect to both the lamp chamber and the transition chamber, having at least a single aperture, and in a preferred embodiment, multiple apertures, leading to the interior of the transition chamber. The socket plate may also have a plurality of lamp socket apertures formed in the socket plate to accept lamp sockets for accommodating compact fluorescent lamps.

Lamp sockets will be carried in the lamp socket apertures of the socket plate to support compact fluorescent lamps that extend downwardly from the bottom surface of the socket plate into the lamp chamber of the luminaire. The lamp sockets may extend part way into the interior of the transition chamber or may be mounted directly to the transition chamber socket plate with only the electrical supply wiring extending into the interior of the transition chamber.

The above and other objects may be achieved by using the apparatus and method disclosed herein to accomplish a primary goal of this invention. One goal is to maintain the temperature of ballasts in a compact fluorescent lamp luminaire as cool as possible. This method may comprise isolating the ballasts from convective heat generated by the lamps of the luminaire. This is facilitated by providing a transition chamber having one, or more than one, apertures for allowing airflow from the lamp chamber of the luminaire into and ultimately through, the transition chamber. The transition chamber is proximate the ballast chamber. Indeed, in one embodiment, the interior wall or walls of the ballast chamber defines the space of the transition chamber that is the passage for air to get from the lamp chamber to outside of the luminaire.

The method of controlling heat in the ballast chamber is further enabled by venting convective heat generated by the lamps through the apertures of the socket plate of the transition chamber and venting the convective heat passing through the transition chamber out an opening at the top end of the transition chamber. In this configuration heat generated by compact fluorescent lamps in the lamp chamber is moved by convection to the transition chamber and heated air in the transition chamber is moved by convection from the transition chamber through the open top of the transition chamber and out of the luminaire. This configuration creates what may be considered a wind tunnel that vents heated air from the lamp chamber through the transition chamber and out the top of the luminaire.

Aspects and applications of the invention presented here are described in this specification and detailed description and shown in the drawings of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . " if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived from the following detailed description when considered in connection with the attached illustrative figures. In the figures, like reference numbers refer to like elements in the various figures.

Elements shown in the figures are illustrated for simplicity and have not necessarily been rendered according to any particular embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are several different and alternative configurations of the invention set forth herein. The full scope of the inventions is not limited to the examples that are described below.

Figure 1:
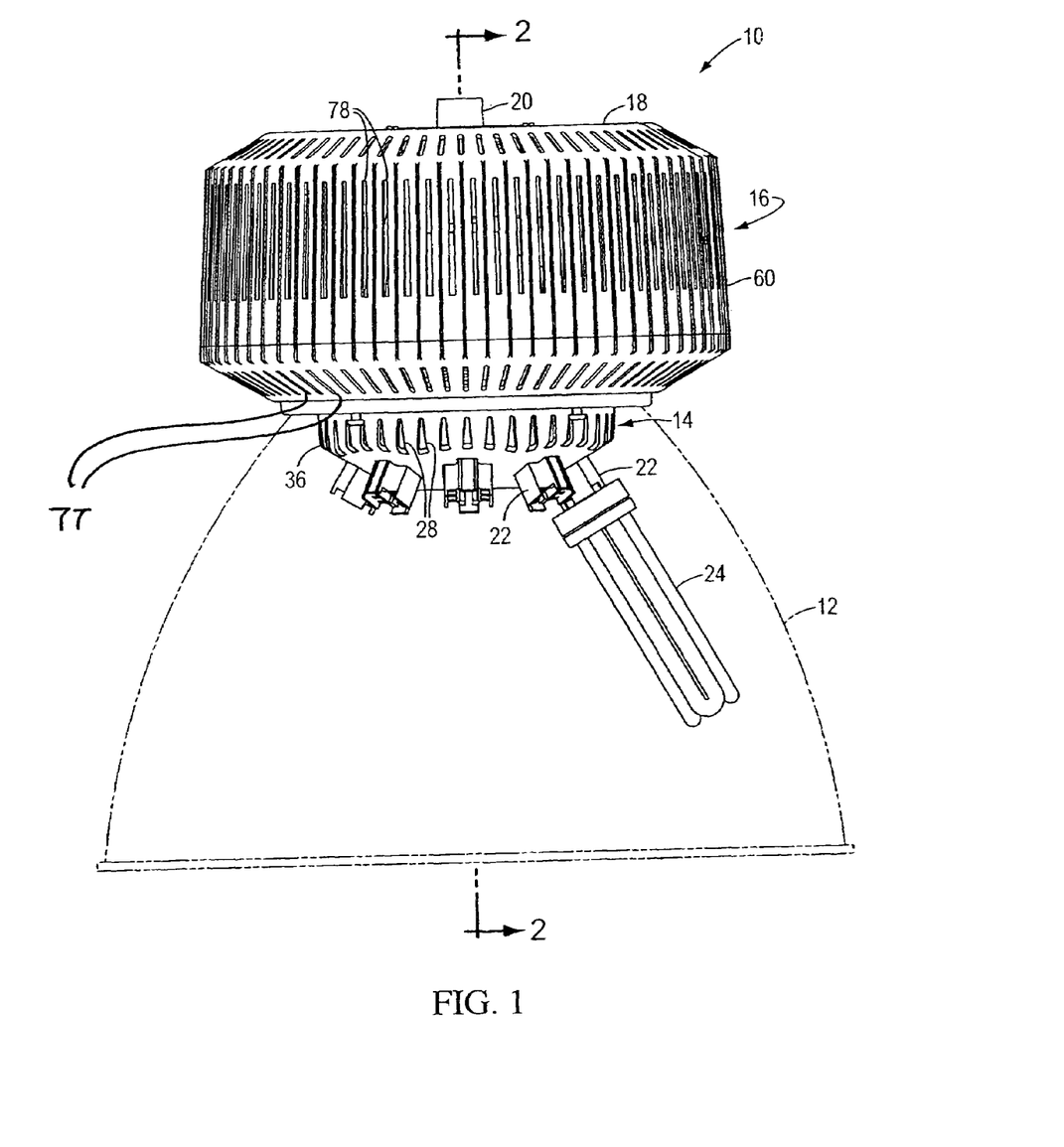
FIG. 1 is an elevation view of one embodiment of a luminaire.

In one embodiment of the invention shown in FIG. 1, a compact fluorescent lamp luminaire generally 10, includes a dome 12, shown in a broken line rendition to reveal one of the plurality of lamps that would be used in this embodiment of the invention. Only one lamp is shown so as to not complicate the view. In the FIG. 1 embodiment, for instance, eight lamps would be installed in the fixture. Not illustrating all the lamps allows a more clear view of the other components located inside the dome. The dome is sometimes referred to as a "reflector" or "refractor," even though it may or may not reflect light from the lamps. The dome may be an opaque dome that prevents light from being transmitted through the wall of the dome. This would be the situation if a well-known aluminum dome is used. Alternatively the dome may be a translucent dome, such as a plastic dome, a Lexalite® acrylic plastic prismatic reflectors, or glass dome, also well known in the art. The inventor also contemplates that other dome transparency options are available, for instance a dome that allows only passage of a certain percentage of light, can also be used. The actual dome configuration is not a limiting element. The shape and light transmissiveness of the dome can be of any of the well-known styles in the industry. Also shown is a transition chamber 14, a ballast chamber generally 16, a lid 18 of the ballast chamber and a hanger element 20.

For convenience, but not as a limitation, the luminaire is presented as a luminaire intended to be supported from above such as by hanging from an electrical box or other structure, neither of which is shown but are well-known in the industry. The compact fluorescent lamps, one style of lamp shown as lamp 24, are housed in the lamp chamber. In the various figures only one lamp is shown but it is expected and normal to have multiple lamps mounted in the lamp chamber. The luminaire shown in FIG. 1 is the usual deployment of elements (except for the number of lamps, which will ordinarily be more than one lamp) of the luminaire with the transition chamber 14 located above the lamp chamber. The ballast chamber, generally 16, is separated from, or a part of the luminaire separate from, but vertically and circumferentially adjacent the transition chamber. It would be unusual, but there may be instances where the luminaire is mounted relatively upside down, or in a deployment offset from the usual vertical deployment shown by the FIG. 1 position, such as, but not limited to, a thirty degree angle from vertical.

Figure 2:
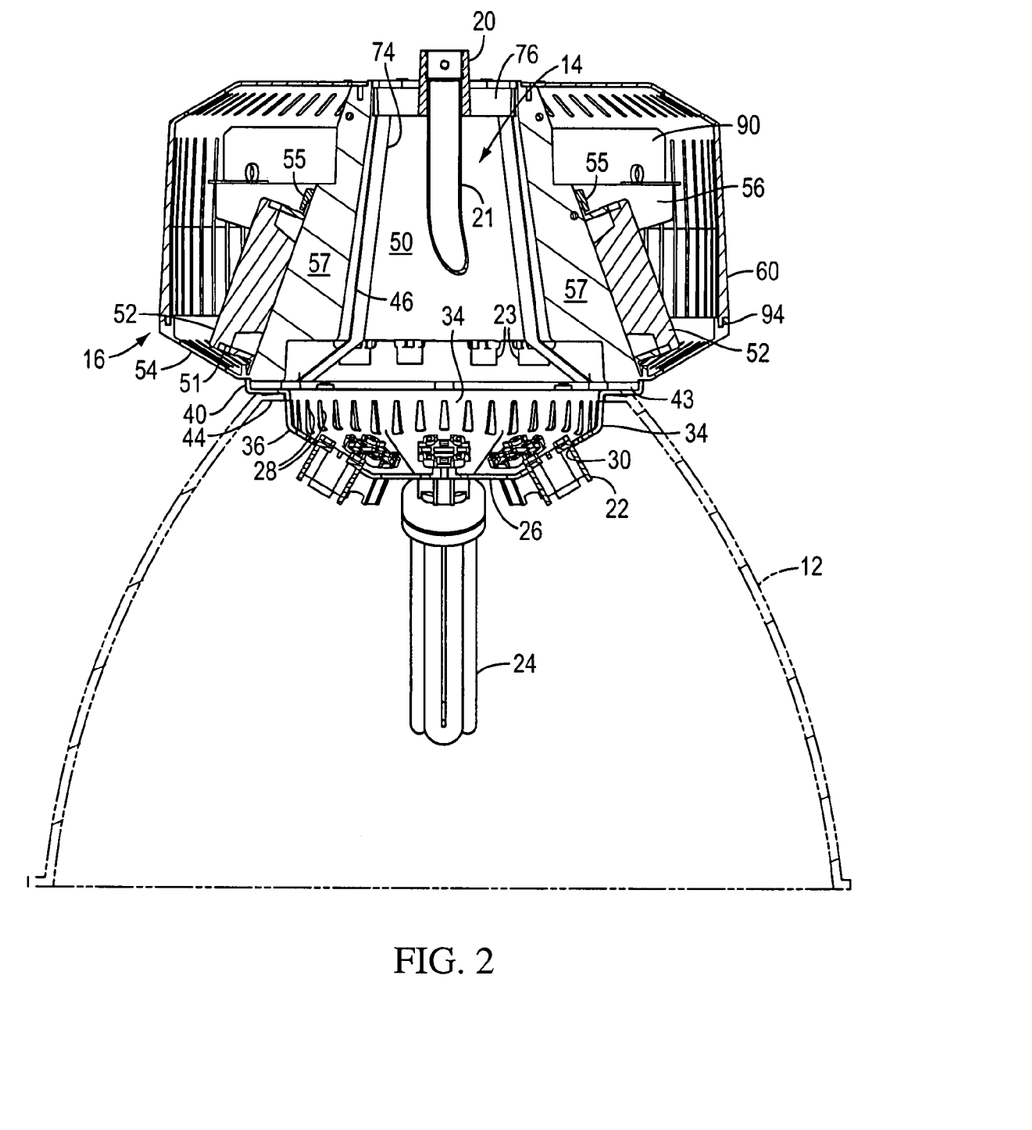
FIG. 2 is a cross sectional elevation view taken through plane 2-2 of the luminaire of FIG. 1.

The invention shown in FIG. 1 can be further understood by reviewing the cross-sectioned view of the luminaire, generally 10, shown in FIG. 2. Some elements hidden from view in FIG. 1 are shown in FIG. 2.

In FIG. 2, lamp sockets, one shown as 22, will accept compact fluorescent lamps, such as the lamp 24.

In one embodiment the lamps chosen for use are seventy-watt compact florescent lamps and eight lamps may be used in each luminaire. It is also contemplated that more or less than eight lamps can be used in different embodiments of a luminaire. For instance, a luminaire having four lamps or six lamps would be common. Luminaires with more than eight lamps or less than four lamps are also contemplated by the inventors. These alternative lamp count configurations are perhaps less common but within the scope of the inventors' invention. It is also possible that an odd number of lamps could be used and this is also an embodiment considered by the inventors. It is further contemplated that lamps of more or less than seventy watts may be used in the luminaire. For instance, lamps of one hundred twenty watts can be used in each luminaire and when a number of one hundred twenty watt lamps, such as four lamps, are used in a luminaire, significant heat is generated. Lamp wattage from low wattage, such as less than forty-two watts, to high wattage, such as one hundred twenty watts or more can be used in the luminaire design disclosed herein.

In this invention the heat generated by a number of lamps for instance, eight seventy-watt lamps or four lamps of one hundred twenty watts is managed by the ventilation plan and design of the luminaire.

Returning to FIG. 2, the lamp sockets, such as 22, project through socket apertures such as 30 in the socket plate 26 of the transition chamber, generally 14. The socket apertures may be in the shape of a cross, as is currently used in one embodiment of lamp sockets known in the art, or any other shape as dictated by the shape of the lamp sockets of the luminaire. In one embodiment, a portion of the lamp sockets 22 extend through the socket apertures 30 into the transition chamber. In an alternative embodiment the lamp sockets will be affixed to the lower socket plate surface and the socket plate may thus be without socket apertures but normally with at least a provision, such as apertures in the socket plate, for wires to extend from the ballasts to the lamp sockets, through the socket plate.

The lamp sockets will be wired to the ballasts and the ballasts will be wired to a source of electricity. In one embodiment the power source wiring could enter the fixture through tube or conduit 21 and connect to the ballasts. In other embodiments the power source wires could enter the ballast chamber by other routes, such as, but not limited to, directly through the top of the ballast chamber through a knock out such as 27 shown in FIG. 5. The ballasts, in one embodiment, are wired to connectors, such as AMP® connectors and then, either through a plug-in connection or a continuous wire, are wired to the lamp sockets, in a well-known manner. Since the wiring requirements from the source of power to the lamp sockets is well known the multitude of wires and their routing is not shown in the various figures, as it would unnecessarily complicate the drawings and obscure some of the components of interest.

The socket plate 26 of the transition chamber, the transition chamber defined in part by the socket plate of the lamp chamber, also includes at least one ventilation aperture, several shown as ventilation apertures 28. In a usual embodiment a multiplicity of ventilation apertures as shown are formed through the socket plate. The shape of the ventilation apertures is not limited to any particular shape and may be the slots as shown, circular shapes, or of any shape that allows the passage of air or airflow from the lamp chamber to the transition chamber. The shape of the ventilation apertures 28 may be designed to comply with regulations and requirements of testing and regulatory organizations. Furthermore, the ventilation apertures need not be located on the vertical wall 34 of the socket plate, that is, in the location shown in FIG. 2 but may be anywhere in and through the socket plate, including, but not limited to, a central area of the socket plate.

In one embodiment a plurality of ventilation apertures 28 are spaced around the circumference of the wall 34. The wall 34 of the socket plate 26 extends from the angled surface 36 to an upturned lip 40 of the socket plate 26. One location for a ventilation aperture 28, for example, is on and through the generally vertical wall 34 of the socket plate 26. In FIGS. 1 and 2 the ventilation apertures are shown in the vertical wall section and across the angled surface 36 to the next plane where the socket apertures are located.

Figure 4:
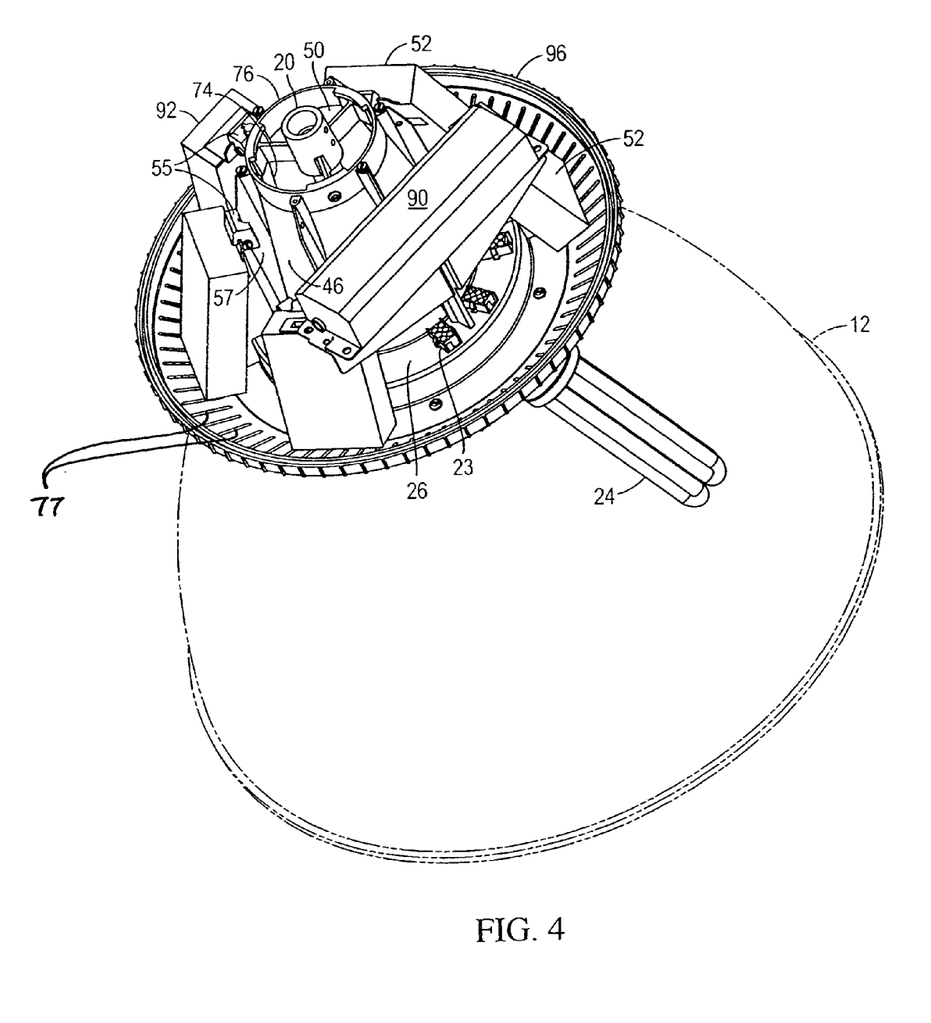
FIG. 4 is an isometric view of the luminaire of FIG. 1 with the top removed to show the ballasts in the ballast chamber of the device.

In FIGS. 2 and 4 the configuration of the transition chamber can be seen. The pertinent section of the ballast chamber has a configuration that looks like a wide brimmed sombrero hat with the top of the hat removed. The ballast chamber, sans the lid portion, includes a base and a truncated cone formed integrally with the base or otherwise attached to the base. The base includes, but is not limited to, the up-ramp surface 54 that extends to the groove 96 on periphery of the base area of the ballast chamber. The base of the ballast chamber will have a large opening over which the truncated cone portion of the transition chamber is positioned. In one embodiment the truncated cone and the base of the ballast chamber are formed as an integral unit. Whether as a one piece unit or a multi-piece unit, the ballast chamber can be of spun metal, cast metal, fabricated metal, plastic, fiberglass, or any other material that is structurally stiff enough for a luminaire and is heat tolerant enough to work in the compact fluorescent lamp environment. In one embodiment the large opening in the base of the transition chamber is bridged over by the socket plate as is shown in the figures. The socket plate becomes a bottom portion of the transition chamber while it is also the top portion of the lamp chamber.

An optional insulator 43 may be installed between the upper surface of the socket plate 26 and the lower side of the base of the ballast chamber just inside the upturned lip 40 of the socket plate. This gasket or insulator is useful as it will assist in minimizing the transition of heat from the socket plate to the base portion of the ballast chamber of the ballast housing generally 16. It is also contemplated that the gasket could be left out of the luminaire as determined by the luminaire designer if it is not needed as a heat management insulator or as an interface between the flange of the socket plate and the base of the ballast chamber. Thus in one embodiment of the invention there is no gasket between the flange of the socket plate and the bottom of the ballast chamber.

In one embodiment the ballast chamber is attached to the socket plate of the transition chamber.

Another option, not shown but easily understood by a person of ordinary skill in the art, is to insert a gasket, also acting as an insulator, between a flange 44 of the dome 12 and the lower side of the socket plate 26. This second insulator could be in addition to or an alternative to, the insulator between the upper side of the flange of the socket plate and the ballast chamber, generally 16.

The ballast chamber 16 includes an interior wall 46 that makes up a portion of the transition chamber 14. The aperture or apertures 28 of the socket plate 26 will feed a stream of heated air into the area 50 of the transition chamber and otherwise allow airflow from the lamp chamber, through the apertures 28 into the transition chamber and out the open top or open end of the transition chamber proximate the hub 76.

The ballast chamber, in one embodiment, is circumferentially disposed about the transition chamber as is shown in FIGS. 2, 4, 6 and 9. This is an inherent configuration in one embodiment as the ballast housing, sans the lid, along with the socket plate, forms the transition chamber.

As shown in FIG. 2, the ballast chamber, generally 16 is provided for housing the ballasts of the luminaire. Ballasts such as 52 are supported in the ballast chamber 56. In one embodiment of the invention, at least a single ballast is mounted to a support bracket 51 or alternatively, an up-ramp surface 54 of the ballast chamber. Location of the ballasts in the ballast chamber may be in any of many locations. Mounting the ballasts to a support bracket 51 or to the up-ramp 54 are alternative ballast mounting locations. Furthermore, the actual mounting location of the ballasts in the ballast chamber may vary based on the number of ballasts, the ballast dimensions and/or wiring requirements of the ballasts housed in the ballast chamber. Ballasts of the type used in compact fluorescent lamp luminaires will drive one or more lamps, thus in an eight lamp luminaire there will often be four ballasts. In a ten lamp luminaire there could be five ballasts and the number of ballasts to be accommodated in the ballast housing will have a bearing on how the ballasts are installed in the ballast housing. There are many other ballast mounting locations in the ballast chamber, such as, but not limited to, mounting the ballasts from the top of the lid 18, mounting the ballasts to the sidewall of the lid, or mounting the ballasts to the center walls of the ballast chamber. Normally the ballasts will be mounted on brackets that will facilitate secure mounting of the ballasts in the ballast chamber.

FIG. 2 shows straps, one of three straps in this embodiment shown as 74, which connect a hub 76 to the socket plate 26. These straps are included in one embodiment of the invention shown in the figures and would be used in an embodiment where the ballast chamber wall is a structurally weak material such as thin plastic, an option for the internal ballast chamber wall, or other material, not capable of long-term support of the weight of the luminaire. In another embodiment of the invention the straps would not be necessary. For instance if the transition chamber is cast or fabricated from a strong material, metallic or not metallic, the straps would not be needed to support the weight of the luminaire as the transition chamber could be designed to carry the weight of the structure.

The hub 76 will have a transverse support, or a plurality of supports, that will support a hanging or hanger element 20 to the hub 76 so that the hanging element extends above the lid of the ballast chamber. The hanging element 20 is used to hang the luminaire from an electrical box or other mounting point. In the embodiment shown in FIG. 2, the three straps may be attached to the socket plate 26 and are spaced evenly about the socket plate. The straps will support the weight of the luminaire from the hanging element 20, through the hub 76 and down to the socket plate 26. More or less than three straps can be used in alternative embodiments. These straps are provided to support the weight of the luminaire and/or for other purposes, such as but not limited to, locating the wall of the transition zone.

Figure 3:
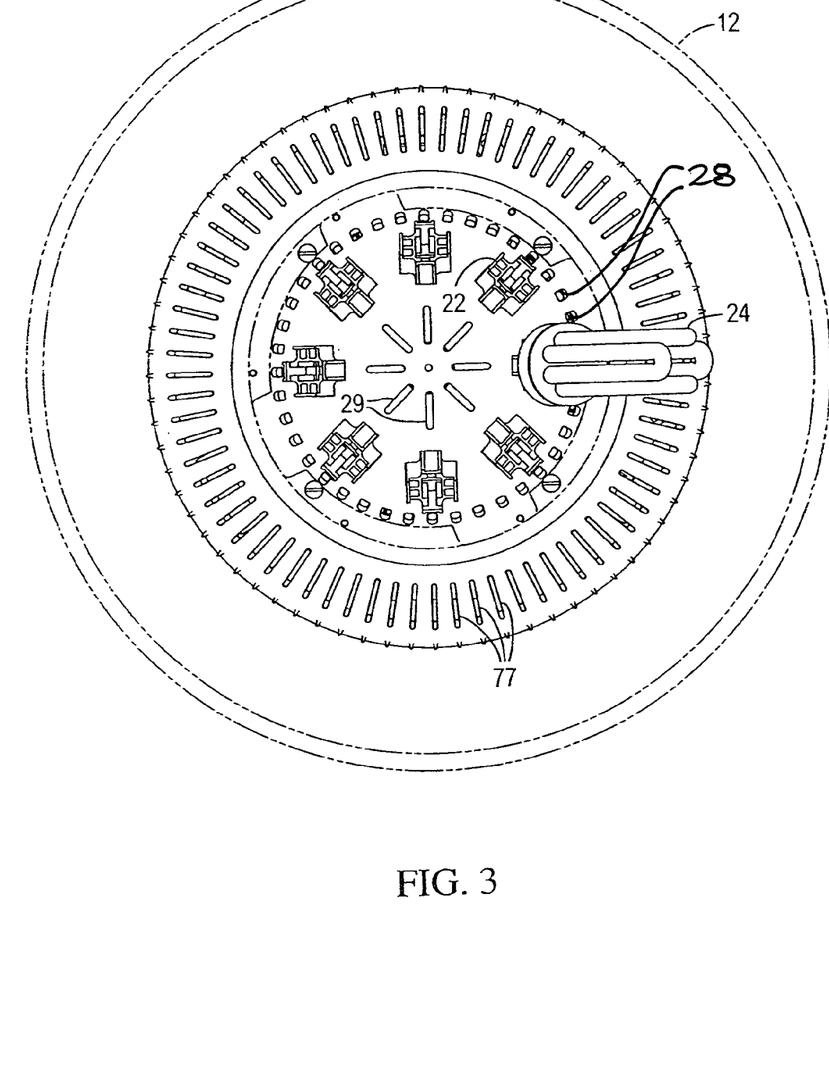
FIG. 3 is a bottom view of the luminaire of FIG. 1.

FIG. 3 is a bottom view of the embodiment of FIGS. 1 and 2. The lamp 24 is inserted into a socket such as 22. This figure shows the use of eight sockets that will accommodate eight lamps; only one lamp is shown installed for clarity. Ventilation slots or apertures 28 are shown, as are optional slots 29 formed in the socket plate relatively inboard of the lamp socket locations. Apertures 77, shown in FIGS. 1, 4 and 8, allow the entry of air to the lower portion of the ballast chamber, are also shown in this FIG. 3.

FIG. 4 is an isometric view of a luminaire with the lid or cap of the device removed to show the interior of the ballast chamber. In this view the ballasts 52 are shown in one mounting location generally vertically arranged tilted inwardly toward the top of the chamber. The wall 46 of the transition chamber is shown extending from the hub or collar 76 to the top of the socket plate 26. In this view an emergency ballast 90 is shown in the ballast chamber. The luminaire may also contain a switch 92 such as a Pulsebloc® lighting controller or step driver to turn on or off some or all of the ballasts in the luminaire.

The ballasts, such as 52, are supported on a lower bracket and are retained at an upper portion of the ballast using a mounting bracket 55. This mounting bracket 55, in one embodiment, is supported on a flange 57. The mounting bracket 55 can be moved vertically along the flange 57 to accommodate ballasts of different lengths or capacities. The inner edge of the flanges 57 are wider then the outer areas of the flanges and may be drilled and tapped to accept screws used to fix the lid of the ballast chamber to the top of the transition zone.

Figure 5:
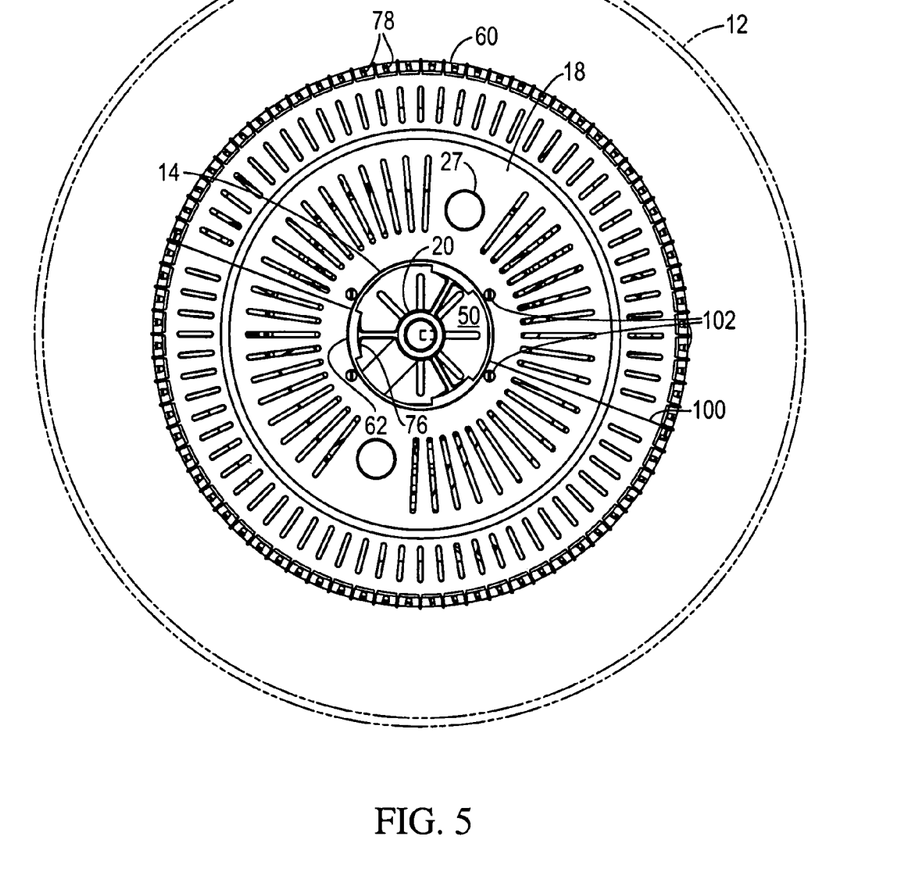
FIG. 5 is a top view of the luminaire of FIG. 1.
Figure 6:
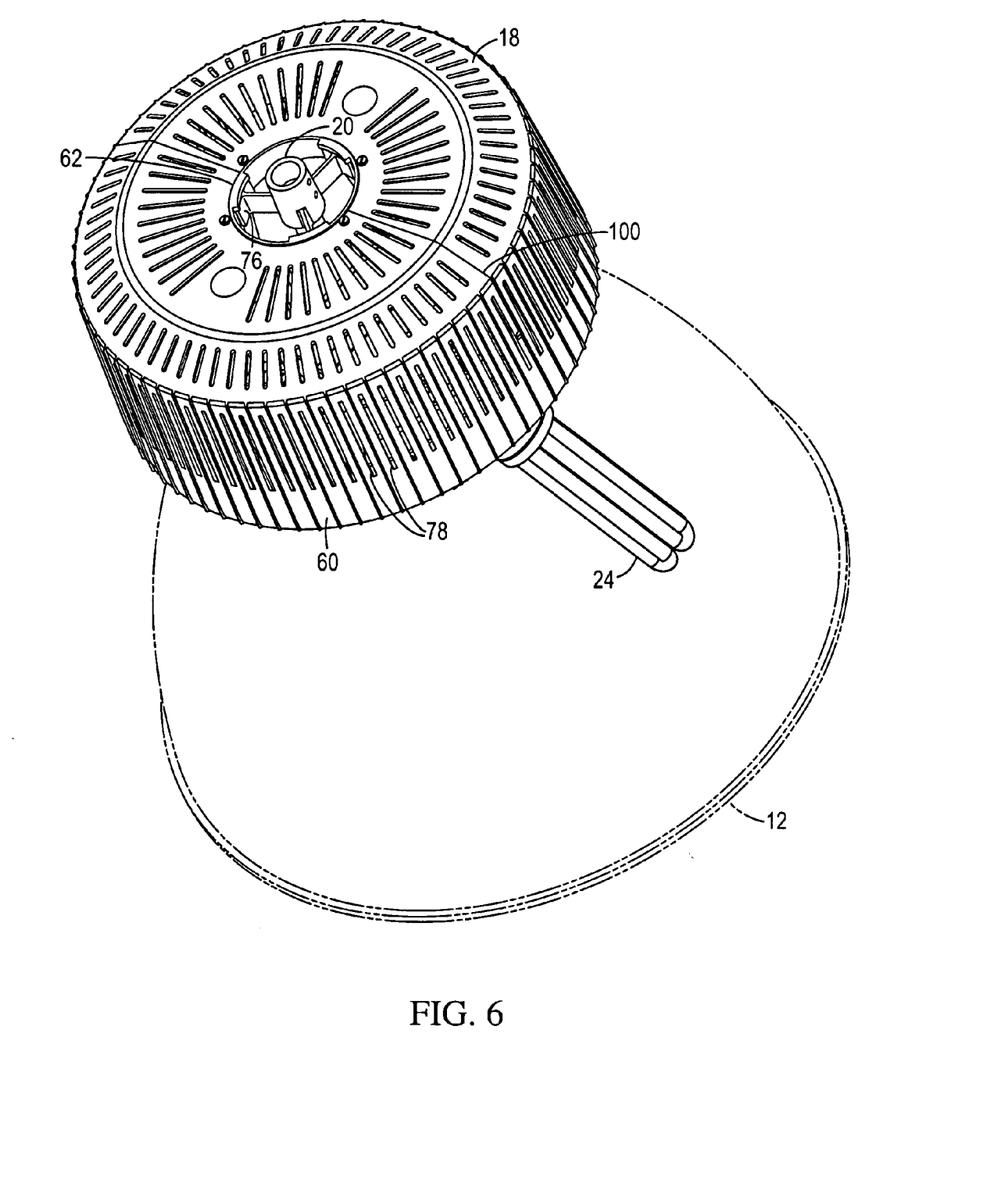
FIG. 6 is an isometric view from the relative top of the luminaire of FIG. 1.

In FIGS. 5 and 6, views of the embodiment shown in FIG. 1, the lid 18 covers the top and sides of the ballast chamber. The lid may include, but is not limited to, a sidewall 60 that has perforations such as vertical perforations represented as 78. The perforations 78 may be formed over the entire surface of the sidewall and may also be formed in the top of the lid so airflow can exit the ballast chamber from the top as well as from the sides of the lid 18. It is also contemplated that the ventilation apertures, shown as slots in the embodiment shown, may be other configurations such as, but not limited to, louvers, small holes, larger holes, a screen surface, or, but not limited to, perforations making up a plurality of apertures. The ventilation apertures may be of significant dimensions such that the ratio of open area to solid area favors more open area. In addition to allowing heated air to escape from the ballast chamber, the perforations 78 in the sidewall of the ballast chamber will allow air to enter the ballast chamber. Such air may be from a breeze or current of air around the luminaire. This could be helpful in exhausting heat from the ballast chamber. Apertures 77 (see FIGS. 1, 3, 4, 8 and 10) in the lower portion of the ballast chamber will allow air to enter the ballast chamber as well. This air may then pass through the ballast chamber to aid in ballast cooling.

In an alternative embodiment, not shown but not needing an illustration for comprehension, the sidewall of the ballast chamber can be un-perforated, that is, the sidewall can be solid and thus hide the interior components of the ballast chamber from view.

The lid 18, in addition to having a plurality of perforations, will have a large aperture 62 in the top of the lid to accommodate the hub 76. This large aperture becomes an exit port or open end of the transition chamber 14. This central aperture 62 has a transverse measurement large enough to accommodate the open end of the transition chamber. The plurality of apertures in one embodiment of the lid may be spaced away from the central aperture of the lid.

In one embodiment the sidewall of the lid and the top of the lid will be connected together. In an embodiment the connection could be by integrating the sidewall and top portions together as by casting or otherwise forming the lid in one piece, but this is only one of numerous plans to connect the sidewall and the top of the lid. For instance, the sidewall and the top can be manufactured independently and then attached using glue, screws, bolts or other fasteners to attach the components together. In another embodiment the lid components would be connected by a tab and groove attachment arrangement.

In some alternative embodiments the lid 18 of the ballast chamber may include only the top surface and not a sidewall structure.

As seen in FIGS. 2 and 4 in one embodiment of an assembled luminaire the lid will fit onto the ballast chamber with the lower edge of the lid having a projection 94 that fits into a groove 96 of the base or bottom of the ballast chamber.

As seen in FIGS. 5 and 6 the lid can be formed of two parts separated at line 100 facilitating access to the interior of the ballast chamber for service and other actions such as but not limited to cleaning, replacement of components, or inspection. Screws such as 102 show one embodiment of securing the two lid parts to the top of the flanges 57. The lid can be formed of more or less than two parts but in one embodiment two parts have been selected. Also screws are not the only available fasteners useful in attaching the lid. Bolts, latches and pins are just some alternative fastener options.

In addition to the lid embodiments shown in the figures it is contemplated that the outer wall of the ballast housing could be attached to the socket plate and the top section of the lid be a separate top that is not formed integral with the outer walls of the ballast chamber, but instead the top could be a separate piece that can be fitted over the outer wall of the ballast chamber.

In FIGS. 1-4, 6 and 9-10 the lamps are shown angled from the vertical centerline of the luminaire. This is one embodiment of the invention. In other embodiments the inventors contemplate that the lamps can be mounted vertically or at angles such that the lamps are angled in toward the vertical centerline of the luminaire, rather than angled out from the vertical centerline as shown in the figures.

In the embodiments illustrated there is an even number of lamp sockets and lamps shown. In other embodiments contemplated by the inventors an odd number of lamps, rather than an even number of lamps, could be used in each luminaire. Likewise either an even number of ballasts or an odd number of ballasts could be used in other embodiments of a luminaire.

Figure 7:
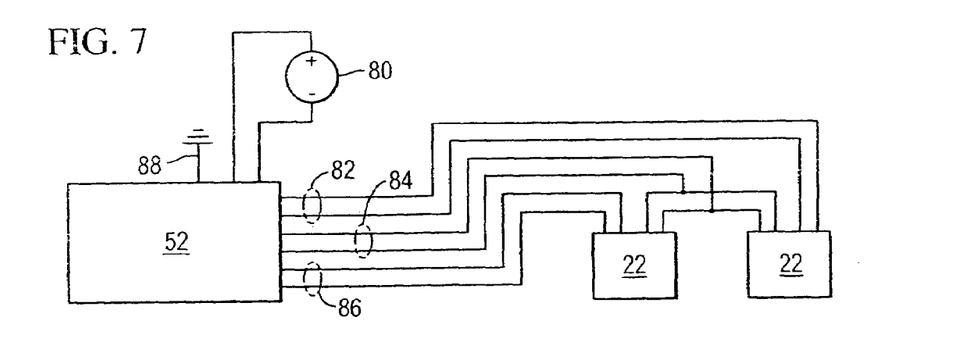
FIG. 7 is a pictorial representation of wiring of one representative ballast in communication with two lamp sockets as may be used in a luminaire.

FIG. 7 is a pictorial representation of one typical embodiment of an electrical circuit showing a schematic wiring configuration of wires connecting a ballast and a pair of lamp sockets. A voltage source 80 provides electrical power to the luminaire and each ballast thereof, either a single ballast or a plurality of ballasts depending on how many ballasts and lamps are used in a particular embodiment. The lamp sockets, such as 22, will each be fed with two sets of wires, such as pair 82 and pair 84 going from the ballast 52 to the lamp socket 22 and two pairs of wires, pair 86 and pair 84 going to a second lamp socket also 22, as is well known in the art. Line 88 represents a ground connection. There are very many different ballast and lamp wiring options and configurations that are well known in the fluorescent lamp art. The configuration shown in FIG. 7 is one of many and is shown to illustrate just one of many configurations of how one ballast could be wired to two lamps. In one embodiment of the luminaire there will be four ballasts and eight lamps, with one ballast serving two lamps. Other embodiments will have different numbers of ballasts and lamps but usually, but not limited to, one ballast serving two lamps. It is also known that one ballast can support one lamp, two lamps, three lamps, or more than three lamps.

Figure 8:
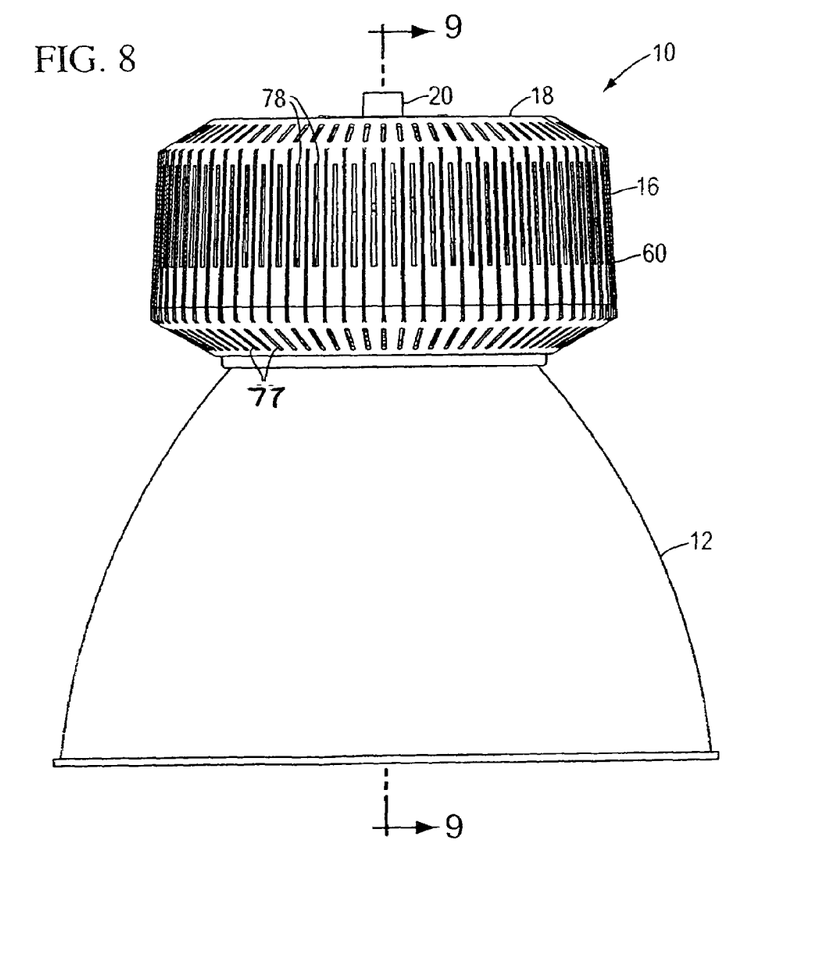
FIG. 8 is an elevation view of a luminaire.

FIG. 8 presents an elevation view of a luminaire where the dome 12 is shown in a solid line view. Plane 9-9 is the plane taken through FIG. 8 for the cross sectional view of FIG. 9. The embodiment of FIGS. 8 and 9 accommodate a lamp and ballasts different from those discussed earlier in that the ballasts are larger and the lamps physically larger as well as of a higher wattage. For instance, the lamp shown as 25 may be a one hundred twenty watt lamp and in this configuration eight lamps would be installed in the luminaire. Only one lamp is shown in this embodiment for simplicity. Several lamp sockets such as 23 are shown. Two of the five lamp sockets shown in this sectioned portion of a luminaire are shown as sectioned lamp sockets.

Figure 9:
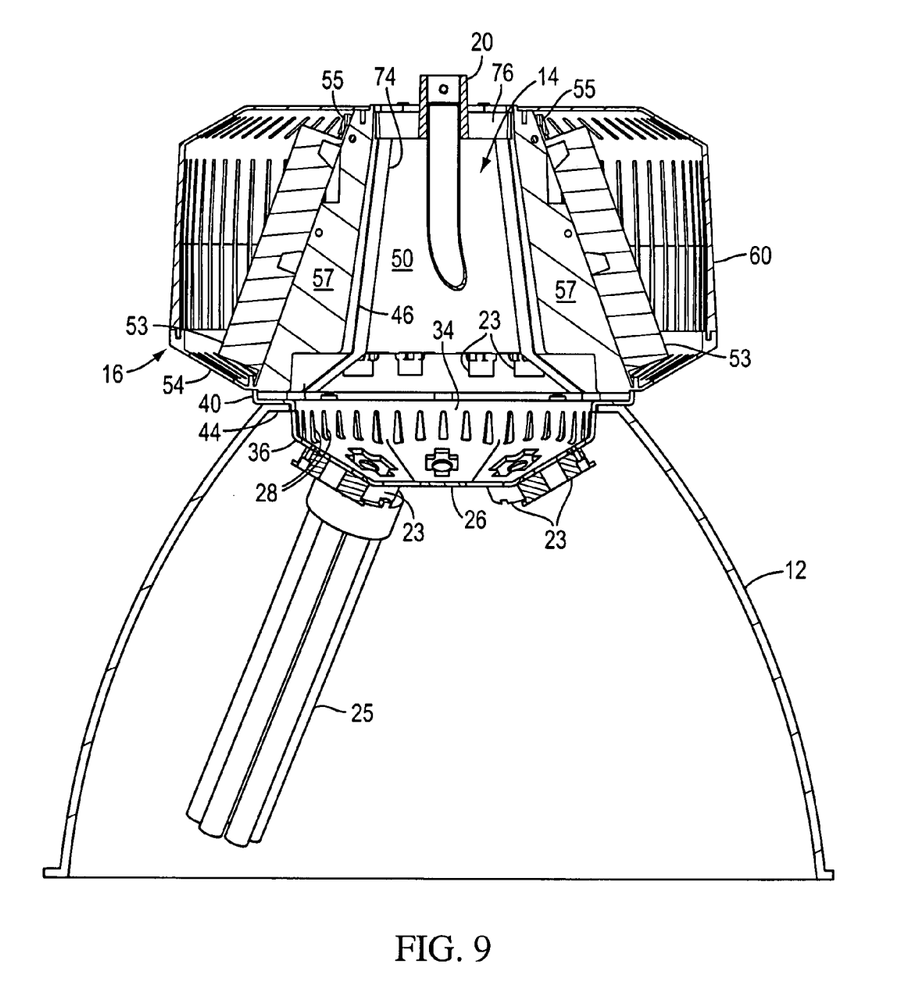
FIG. 9 is a cross sectional view taken through plane 9-9 of FIG. 8.

Ballasts 53 in FIG. 9 are longer than those shown in FIG. 2 but may use the same mounting bases and upper brackets 55 as are shown in that figure. The upper brackets 55 will be positioned on the flanges 57 sufficiently high on the flanges to accommodate the length of the longer ballasts.

Figure 10:
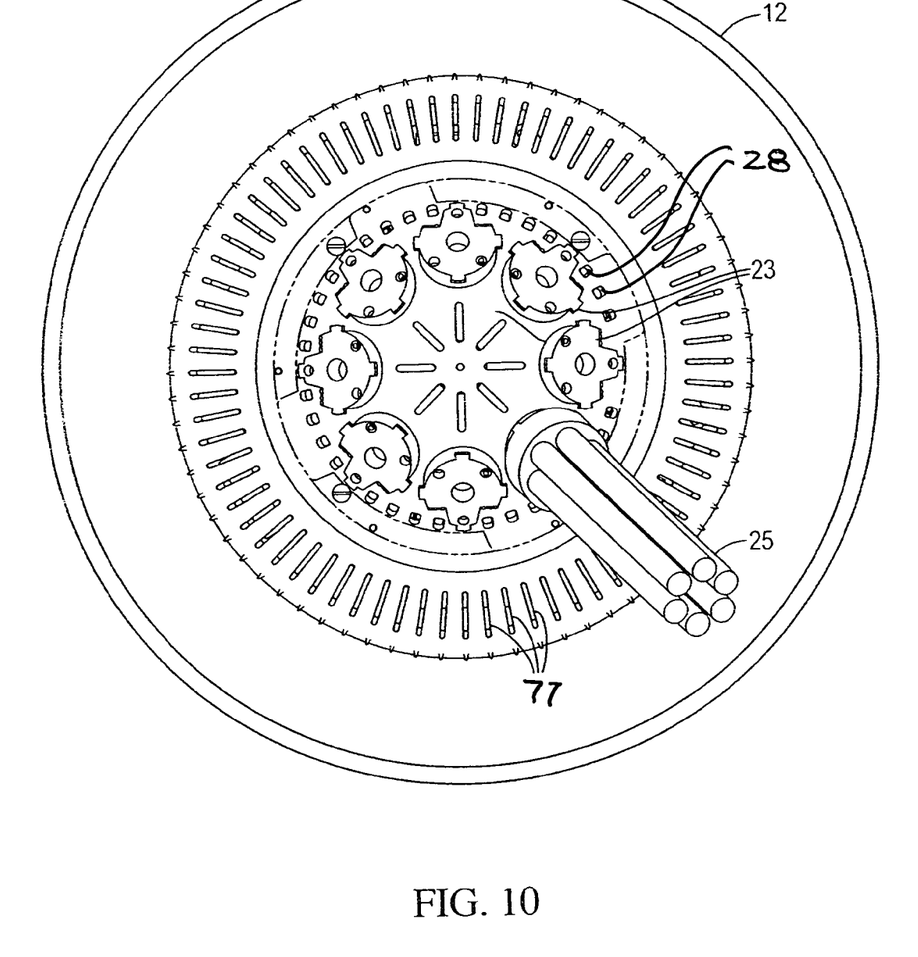
FIG. 10 is a bottom view of the luminaire of FIG. 8.

FIG. 10 is a bottom view of the luminaire shown in FIG. 8. As can be seen in this view the eight lamp sockets such as 23 are evenly spaced around the socket plate. One lamp is shown installed. Eight lamps would be used in this embodiment at the same time although only one lamp is shown in FIG. 10 for clarity. As pointed out above, luminaires having more or less than eight lamps are also possible and in those other embodiments the number of lamp sockets needed would be installed in the socket plate.

In summary one embodiment of the invention presented here is a compact fluorescent lamp luminaire that includes a lamp chamber having an interior housing heat generating compact fluorescent lamps and a transition chamber vertically adjacent the lamp chamber. The transition chamber has, at least, an interior and an open end. There is an aperture in the lamp chamber allowing air to pass from the interior of the lamp chamber to the interior of the transition chamber. Also an element of the luminaire is a ballast chamber containing at least one ballast. The ballast chamber has an interior wall defining a portion of the transition chamber, with the transition chamber terminating at an open end. In this embodiment the portion of the transition chamber defined by the interior wall of the ballast chamber restricts air from the lamp chamber from entering the ballast chamber.

In another embodiment the wall of the transition chamber is a wall that is integral with the transition chamber rather than being a component of the ballast chamber. The wall of the transition chamber will separate the interior of the ballast chamber from the interior of the transition chamber.

In a very simplified embodiment of the invention a compact fluorescent lamp luminaire includes a first zone having an interior that houses compact fluorescent lamps of the luminaire; a second zone having a passageway in communication with the interior of the first zone; and a third zone adjacent the second zone and the third zone having an interior separated from the interior of the first zone.

The second zone, defining the transition chamber, having an aperture to the first zone facilitates communication between the interior of the first zone and the transition chamber. The third zone may include a ballast chamber.

The above apparatus is helpful in providing a method of promoting airflow and managing heat generated by lamps housed in a dome of a compact fluorescent lamp luminaire. The method may include at least providing a luminaire having multiple zones and housing a plurality of lamps in a first zone of the luminaire that includes the dome and locating a second zone having a transition chamber with an open top. This transition chamber is positioned adjacent the dome of the luminaire. The method will also include locating a third zone having a ballast chamber adjacent the transition chamber. The ballast chamber includes an interior wall making up a portion of the transition chamber and the ballast chamber will house ballasts of the luminaire. One method will also include locating a plurality of ballasts in the ballast chamber whereby heat generated by compact fluorescent lamps in the first zone is moved to the second zone and heated air in the second zone is moved from the transition chamber through the open top of the transition chamber without the heated air entering the ballast chamber.

While the invention is described herein in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

What is claimed is:

1. A compact fluorescent lamp luminaire comprising:
   a lamp chamber having an interior, the interior of the lamp chamber housing heat generating compact fluorescent lamps;
   a transition chamber adjacent the lamp chamber, the transition chamber having an interior and an open end;
   an aperture in the lamp chamber allowing air to pass from the interior of the lamp chamber to the interior of the transition chamber;
   a ballast chamber containing a ballast, the ballast chamber having an interior wall defining a portion of the transition chamber terminating at the open end;
   whereby the portion of the transition chamber defined by the interior wall of the ballast chamber restricts air from the lamp chamber from entering the ballast chamber.

2. The invention in accordance with claim 1 further comprising the ballast chamber circumferentially disposed about the transition chamber.

3. The invention in accordance with claim 1 wherein heated air is moved from the lamp chamber of the luminaire to the interior of the transition chamber by convection.

4. The invention in accordance with claim 3 wherein heated air is moved through the transition chamber by convection.

5. The invention in accordance with claim 1 wherein heated air is moved from the lamp chamber of the luminaire to the interior of the transition chamber, through the portion of the transition chamber defined by the ballast chamber wall and out the open end of the transition chamber by convection.

6. The invention in accordance with claim 1 further comprising:
   the lamp chamber defined in part by a socket plate;
   lamp sockets mounted on the socket plate;
   the transition chamber defined in part by the socket plate of the lamp chamber.

7. The invention in accordance with claim 6 wherein the socket plate comprises a plurality of apertures formed in the socket plate.

8. The invention in accordance with claim 7 wherein the apertures are formed on the wall of the socket plate.

9. The invention in accordance with claim 1 wherein the ballast chamber is attached to the socket plate.

10. The invention in accordance with claim 9 further comprising a gasket located between the socket plate and the ballast chamber.

11. The invention in accordance with claim 1 wherein the ballast chamber further comprises a lid.

12. The invention in accordance with claim 11 wherein the lid comprises a sidewall portion.

13. The invention in accordance with claim 12 where the sidewall is perforated with a plurality of apertures.

14. The invention in accordance with claim 11 wherein the lid comprises a top portion.

15. The invention in accordance with claim 14 wherein the top portion of the lid comprises a central aperture having transverse measurement large enough to accommodate the open top end of the transition chamber.

16. The invention in accordance with claim 15 wherein the top portion of the lid further comprises a plurality of apertures spaced away from the central aperture.

17. The invention in accordance with claim 11 wherein the lid comprises a sidewall and a top portion connected together.

18. The invention in accordance with claim 17 wherein the sidewall and the top portion are integral.

19. The invention in accordance with claim 11 wherein the lid is perforated.

20. A compact fluorescent lamp luminaire comprising:
   a first zone having an interior, the interior of the first zone housing compact fluorescent lamps of the luminaire;
   a second zone having a passageway in communication with the interior of the first zone; the second zone defining a transition chamber and the second zone further comprising a plurality of apertures facilitating communication between the interior of the first zone and the transition chamber; and
   a third zone comprising a ballast chamber, the third zone adjacent the second zone and the third zone having an interior, the interior of the third zone separated from the interior of the first zone by a wall between the ballast chamber and the interior of the transition chamber, the wall being an interior wall of the ballast chamber.

21. The invention in accordance with claim 20 wherein the wall is a wall of the transition chamber.

22. The invention in accordance with claim 20 further comprising ballasts located in the third zone.

23. A method of managing heat generated by lamps housed in a dome of a compact fluorescent lamp luminaire comprising the acts of:
   providing a luminaire having multiple zones;
   housing a plurality of lamps in a first zone of the luminaire that includes the dome;
   locating a second zone comprising a transition chamber having an open top, the transition chamber adjacent the dome of the luminaire;
   locating a third zone comprising a ballast chamber adjacent the transition chamber, the ballast chamber including an interior wall making up a portion of the transition chamber, the ballast chamber for housing ballasts of the luminaire;
   locating a plurality of ballasts in the ballast chamber, whereby heat generated by compact fluorescent lamps in the first zone is moved to the second zone and heated air in the second zone is moved from the transition chamber through the open top of the transition chamber without the heated air entering the ballast chamber.

24. The method set forth in claim 23 further comprising isolating the ballasts from convection heat generated by the lamps of the luminaire.

25. The invention in accordance with claim 23 further comprising the act of moving the heat generated by the lamps from one of the zones to another of the zones through convection.

26. The invention in accordance with claim 23 further comprising the act of moving the heat generated by the lamps from one of the zones to another of the zones through convection and conduction.

* * * * *